United States Patent
Isaji et al.

(10) Patent No.: US 7,455,044 B2
(45) Date of Patent: Nov. 25, 2008

(54) INTAKE DEVICE OF INTERNAL COMBUSTION ENGINE

(75) Inventors: Hiroshi Isaji, Yokohama (JP); Kouichi Mori, Kanagawa (JP); Shunichi Mitsuishi, Kanagawa (JP); Satoshi Nishii, Kawasaki (JP); Kanjo Arimatsu, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/730,707

(22) Filed: Apr. 3, 2007

(65) Prior Publication Data

US 2007/0227495 A1 Oct. 4, 2007

(30) Foreign Application Priority Data

Apr. 4, 2006 (JP) ............................. 2006-102896

(51) Int. Cl.
*F02B 31/06* (2006.01)
(52) U.S. Cl. ...................... 123/308; 123/432; 123/306; 123/336; 123/337
(58) Field of Classification Search ................ 123/306, 123/308, 336, 337, 432; 251/305, 306
See application file for complete search history.

(56) References Cited

U.S. PATENT DOCUMENTS

| 4,726,341 | A | * | 2/1988 | Muranaka et al. ............ 123/432 |
| 5,640,941 | A | * | 6/1997 | Hazen et al. ................. 123/306 |
| 6,367,448 | B1 | * | 4/2002 | Sugiyama et al. ............ 123/306 |
| 6,394,066 | B1 | * | 5/2002 | Chou et al. .................. 123/308 |
| 6,712,038 | B2 | * | 3/2004 | Hiraku et al. ................ 123/306 |
| 6,868,823 | B2 | | 3/2005 | Sakai et al. |
| 2006/0048738 | A1 | * | 3/2006 | Isaji et al. .............. 123/184.56 |

FOREIGN PATENT DOCUMENTS

JP 2004-124835 A 4/2004

\* cited by examiner

*Primary Examiner*—Erick Solis
(74) *Attorney, Agent, or Firm*—Foley & Lardner LLP

(57) ABSTRACT

An intake control valve of an intake device of an internal combustion engine comprises a given portion defined by an air intake passage that leads to a combustion chamber of the engine through an intake valve; a pivot shaft passing through the given portion; and a valve plate secured to the pivot shaft to pivot therewith within the given portion. The valve plate is pivotal between a close position to close the air intake passage and an open position to open the air intake passage. When the valve plate assumes the close position, the interior of the air intake passage downstream the valve plate is formed with mutually isolated first and second air flows that are separated and oriented to enhance a flow of air/fuel mixture in the combustion chamber.

18 Claims, 5 Drawing Sheets

INTAKE DEVICE OF INTERNAL COMBUSTION ENGINE

BACKGROUND OF THE INVENTION

1. Field of the Invention

The present invention relates in general to intake devices of an internal combustion engine and more particularly to intake devices of a type that comprises an intake control valve installed in an intake tube of each cylinder of the engine. More specifically, the present invention is concerned with the intake device of such type that enhances a gas flow in each combustion chamber.

2. Description of the Related Art

As is known, for improving combustion of an internal combustion engine, more specifically, for assuring a stable combustion of a lean air/fuel mixture, it is effective to enhance a gas flow in the-combustion chamber. Swirling and tumbling effects are those that enhance the gas flow in the combustion chamber.

One of intake devices of an internal combustion engine that enhances such gas flow is disclosed by Japanese Laid-open Patent Application (Tokkai) 2004-124835. In the device disclosed by the publication, a passage is provided which extends from a diametrically one part of a downstream portion of an intake port to the diametrically other part of an upstream portion of the same where a larger intake air flow is needed. With this, part of the intake air flowing along the one part of the intake port is forcedly led to the upstream other part of the same thereby to enhance the gas flow in the combustion chamber. Actually, with this measure, the tumbling effect is increased or enhanced.

SUMMARY OF THE INVENTION

However, the measure of the publication sometimes brings about an unexpected phenomenon. That is, at the side of the intake port where part of the intake air is taken or sucked, a smaller intake air flow is inevitably carried out along the intake port. However, such smaller intake air flow tends to induce a backflow of a residual gas in the cylinder back into the intake port. The residual gas may reach the intake control valve because of creation of a lower pressure area at a portion downstream the intake control valve, which causes the intake control valve and its surrounding area to have carbon particles deposited thereon. Of course, in such case, a satisfied intake air control is not expected by the intake control valve.

Accordingly, it is an object of the present invention to provide an intake device of an internal combustion engine, which is free of the above-mentioned drawbacks.

According to the present invention, there is provided an intake device of an internal combustion engine, which exhibits not only enhancement of gas flow in the combustion chamber by an intake control valve but also suppression of the undesired backflow of a residual gas into the intake port.

In accordance with a first aspect of the present invention, there is provided an intake device of an internal combustion engine, which comprises an air intake passage leading to a combustion chamber of the engine through an intake valve; a fuel injection valve provided in the air intake passage to inject a fuel into the air intake passage; and an intake control valve arranged in the air intake passage at a position upstream of the fuel injection valve, wherein the intake control valve comprises a given portion defined by the air intake passage a pivot shaft passing through the given portion; a valve plate secured to the pivot shaft to pivot therewith within the given portion, the valve plate being pivotal between a close position to close the air intake passage and an open position to open the air intake passage; and an arrangement that provides, when the valve plate assumes the close position, the interior of the air intake passage downstream the valve plate with mutually isolated first and second air flows that are separated and oriented to enhance a flow of air/fuel mixture in the combustion chamber.

In accordance with a second aspect of the present invention, there is provided an intake device of an internal combustion engine, which comprises an air intake passage leading to a combustion chamber of the engine through an intake valve; a fuel injection valve provided in the air intake passage to inject a fuel into the air intake passage; a throttle valve installed in the air intake passage upstream of the fuel injection valve to control the amount of air led to the combustion chamber; a control unit that controls operation of the fuel injection valve and the throttle valve in accordance with an operation condition of the engine; and an intake control valve arranged in the air intake passage between the throttle valve and the fuel injection valve, wherein the intake control valve comprises a rectangular parallelepiped given portion defined by the air intake passage; a pivot shaft passing through the given portion, the pivot shaft being controlled by the control unit; a rectangular valve plate secured to the pivot shaft to pivot therewith within the given portion, the rectangular valve plate being pivotal between a close position to close the air intake passage and an open position to open the air intake passage; and an upper side open portion that is provided when the valve plate assumes the close position, the upper side open portion being a given cut formed in an upper right half portion of the valve plate; and a lower side open portion that is provided when the valve plate assumes the close position, the lower side open portion being an open portion provided at an opposite position of the given cut with respect to an axial center line of the air intake passage, wherein a flow passage sectional area of the lower side open portion is smaller than that of the upper side open portion.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, embodiments of the present invention will be described in detail with reference to the accompanying drawings.

For ease of understanding, various directional terms, such as upper, lower, right, left, upward and the like are used in the description. However, such terms are to be understood with respect to only a drawing or drawings on which a corresponding part or portion is shown. Furthermore, throughout the description, substantially same parts or elements are denoted by the same numerals.

Figure 1:
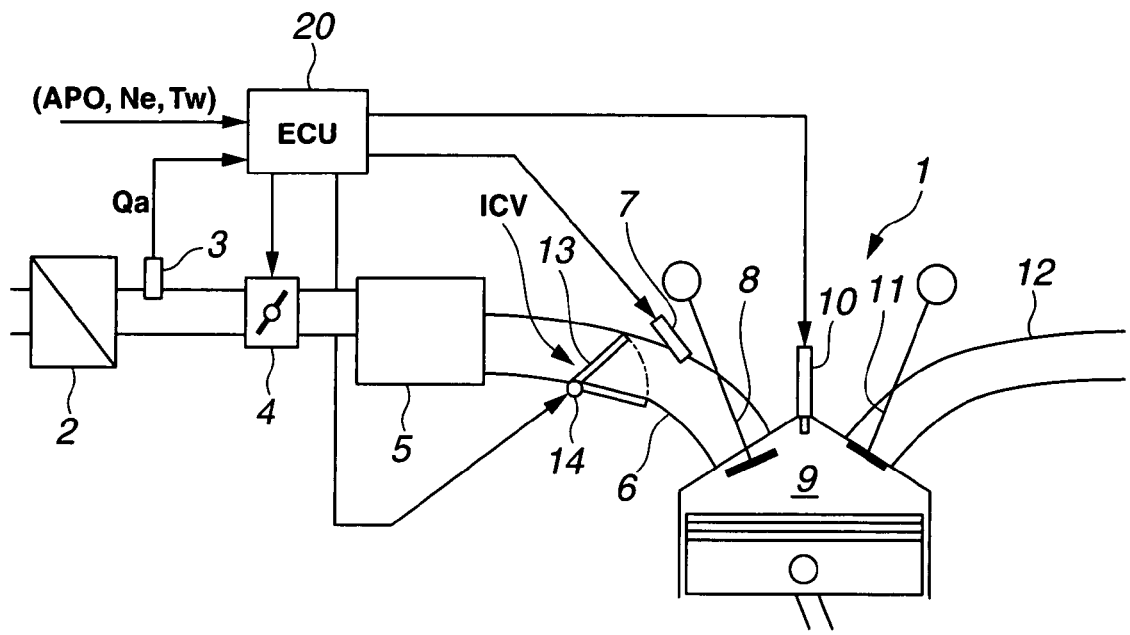
FIG. 1 is a diagrammatic system view of an internal combustion engine to which the present invention is practically applied.

Referring to FIG. 1, there is schematically shown an internal combustion engine to which a first embodiment of the present invention is practically applied.

In the drawing, denoted by numeral 1 is an internal combustion engine. Under operation of the engine 1, air is led into an air cleaner 2 to be cleaned. Air is then led to an electronically controlled throttle valve 4. Before reaching throttle valve 4, a flow rate of air is measured by an air flow meter 3. As will be described in detail hereinafter, a flow rate of air led to the engine 1 is controlled by throttle valve 4. Air is then led to each intake tube 6 through an intake collector 5. Each intake tube 6 has an electronically controlled fuel injection valve 7 from which a fuel is injected to mix with the air to form an air/fuel mixture that is led into a combustion chamber 9 through an intake valve 8.

Upon reaching combustion chamber 9, the air/fuel mixture is ignited by an ignition plug 10 and burnt. A combustion gas (viz., exhaust gas) thus produced in combustion chamber 9 is discharged to an exhaust passage 12 through an exhaust valve 11. Thereafter, the exhaust gas is purified by an exhaust gas purifying device, viz., catalytic converter (not shown), mounted in exhaust passage 12 and discharged to open air.

As shown, each intake tube 6 is provided with an intake control valve ICV at a position upstream fuel injection valve 7. Intake control valve ICV is of a so-called flap type that comprises a pivot shaft 14 that is rotatably held by a lower wall portion of intake tube 6 and a valve plate 13 that is fixed at its lower end to pivot shaft 14 to pivot therewith. That is, by controlling the angle of the valve plate 13, the flow passage area of intake tube 6 can be adjusted.

It is to be noted that pivot shaft 14 is a common shaft that extends along an axis of the engine 1 and has a plurality of valve plates 13, for respective intake tubes 6, fixed thereto. Thus, in case of a four cylinder inline engine, four valve plates 13 are mounted to the common shaft 14 to pivot therewith.

Figure 2A:
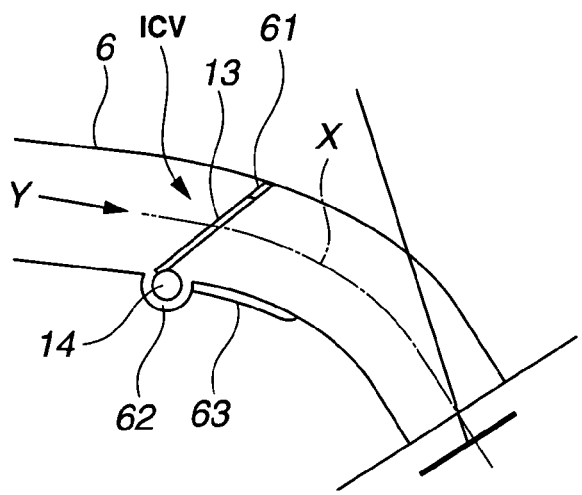
FIG. 2A is a schematically illustrated intake device of a first embodiment of the present invention under a condition wherein an intake control valve is closed.
Figure 2B:
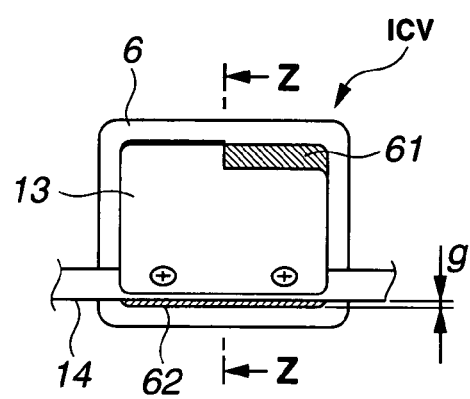
FIG. 2B is a schematic view taken from the direction of an arrow "Y" of FIG. 2A.

As is understood from FIG. 2B, valve plate 13 is rectangular in shape and thus a given portion of intake tube 6 where valve plate 13 is pivotally received has a rectangular cross section. That is, the given portion has a rectangular parallelepiped shape.

As is seen from FIG. 2B, the rectangular valve plate 13 is formed at its upper right half portion with a rectangular cut 61 which serves as an upper side open portion 61 as will be described in detail hereinafter. It is to be noted that FIG. 2B is a view taken from the direction of the arrow "Y" of FIG. 2A.

Figure 2C:
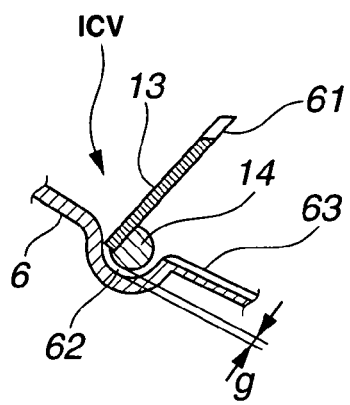
FIG. 2C is a sectional view taken along the line "Z-Z" of FIG. 2B, showing an arrangement of a pivot shaft to which a valve plate of the intake control valve is secured.

Furthermore, as is seen from FIGS. 2B and 2C, upon assemblage of intake control valve ICV in the rectangular parallelepiped given portion of intake tube 6, an elongate clearance 62 is formed or defined between pivot shaft 14 and a bottom wall of the given portion of intake tube 6. As is understood from FIGS. 2B and 2C, the bottom wall is formed with a rounded groove that extends along pivot shaft 14 to provide the elongate clearance 62 that has a thickness of "g". As will be described in detail hereinafter, the elongate clearance 62 serves as a lower side open portion 62.

It is now to be noted that as is seen from FIG. 2A, when intake control valve ICV is in its full-close position, the upper side open portion 61 is positioned above an axial center line "X" of intake tube 6, and the lower side open portion 62 is positioned below the axial center line "X". It is further to be noted that when intake control valve ICV is in its full-open position, the rectangular valve plate 13 is neatly received in a recess 63 formed in a lower wall part of intake tube 6.

Figure 2D:
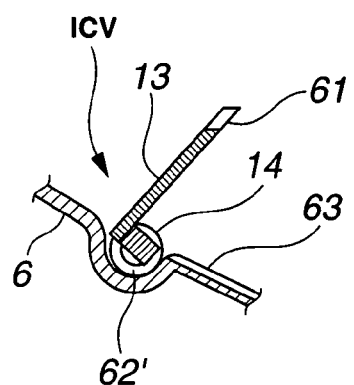
FIG. 2D is a view similar to FIG. 2C, but showing a modification of the arrangement of the pivot shaft.

Referring to FIG. 2D, there is shown a modification 62' of the lower side open portion 62. In this modification 62', pivot shaft 14 is formed thereabout with at least one groove that constitutes the lower side open portion 62.

It is to be noted that the upper side open portion 61 functions to enhance a flow of the air/fuel mixture in combustion chamber 9. Basically, the position and size of the upper side open portion 61 are varied for each engine. However, it has been revealed that for the enhanced gas flow in combustion chamber 9, it is preferable to position the open portion 61 at a right upper or left upper portion of the rectangular parallelepiped given portion of intake tube 6.

It is further to be noted that the lower side open portion 62 functions to suppress or at least minimize undesired backflow of a residual gas in the cylinder back into intake tube 6 and creation of a lower pressure area at a portion downstream of intake control valve ICV when intake control valve ICV is in its closed position.

Experiments and simulation carried out by the inventors have revealed that when the area of the lower side open portion 62 is about 20 to 25% of that of the upper side open portion 61, the above-mentioned two functions show a satisfied level.

Referring back to FIG. 1, an engine control unit ECU 20 is arranged which electronically controls throttle valve 4, intake control valve ICV, fuel injection valve 7 and ignition plug 10 in accordance with an operation condition of engine 1 and other conditions.

For such controlling, various information signals are fed to engine control unit ECU 20, which are for example a signal from air flow meter 3 that represents an amount "Qa" of intake air, a signal from an accelerator open degree sensor (not shown) that represents an open (or depressed) degree "APO" of an accelerator pedal (not shown), a signal from a crank angle sensor (not shown) that represents an engine rotation speed "Ne" and a signal from a temperature sensor (not shown) that represents a temperature "Tw" of an engine cooling water.

In the following, operation of the intake device of the present invention will be described with the aid of the accompanying drawings, especially FIGS. 1, 2A to 2C and 3.

Figure 3:
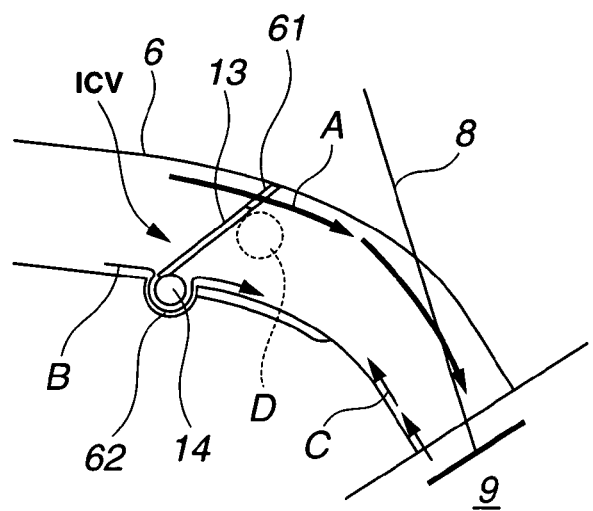
FIG. 3 is a view similar to FIG. 1, but showing advantageous operation of the intake device of the first embodiment of the present invention.

When the engine 1 is under a low speed low load operation condition, engine control unit ECU 20 controls intake control valve ICV to take the full-close position as is shown in FIG. 3.

Under this condition, for the reasons as mentioned hereinabove, the upper side open portion 61 and the lower side open portion 62 are provided by valve plate 13 and pivot shaft 14 respectively. Accordingly, as is seen from FIG. 3, during flow, the intake air is divided into upper and lower flows "A" and "B" that run through the upper and lower side open portions 61 and 62 respectively.

As is described hereinabove, the area of the lower side open portion 62 is about 20 to 25% of that of the upper side open portion 61, and thus, most of the intake air is forced to run through the upper side open portion 61 as is indicated by the arrow "A". The intake air running through the opening 61 is accelerated and rushed into combustion chamber 9 with a certain inlet angle relative to the chamber 9 together with the injected fuel from fuel injection valve 7 (see FIG. 1). With this action, enhanced swirling and tumbling effects of intake air are produced in combustion chamber 9.

While, part of the intake air runs through the lower side open portion 62 as is indicated by the arrow "B". As is seen from the drawing of FIG. 3, the intake air run in the direction of arrow "B" opposes a backflow of a residual gas from the cylinder 9 as indicated by an arrow "C", and thus the backflow of the residual gas is suppressed or at least minimized. Furthermore, at the same time, creation of undesired lower pressure area "D" at the portion downstream of intake control valve ICV is suppressed or at least minimized.

Accordingly, a combustion stability of the engine 1 under a low speed low load operation is improved especially when the engine 1 is operated on a lean air/fuel mixture. Furthermore, the undesired backflow of a residual gas, which would occur when intake control valve ICV is in its close position, is suppressed or at least minimized by the air flow that has passed through the lower side open portion 62. This means that intake control valve ICV and its surrounding area are prevented from being deposited by carbon particles. Thus, a stable intake air control is assured for a long time by intake control valve ICV.

Furthermore, due to the measures mentioned hereinabove, generation of vortex of air in intake tube 6 at a position downstream intake control device ICV is minimized, which suppresses undesired backflow of the residual gas from combustion chamber 9 of engine 1 back into intake tube 6.

As has been mentioned hereinabove, in place of the lower side open portion 62 shown by FIG. 2C, the modification 62' shown in FIG. 2D is usable in the invention. That is, in this modification 62', the groove formed about pivot shaft 14 serves as the lower side open portion 62, and thus substantially same effect is obtained from such modification 62'.

Referring to FIGS. 4A, 4B, 4C and 4D, there are shown first, second, third and fourth modifications ICV-1, ICV-2, ICV-3 and ICV-4 of the intake control valve ICV, which are also usable in the intake device of the first embodiment of the present invention.

Figure 4A:
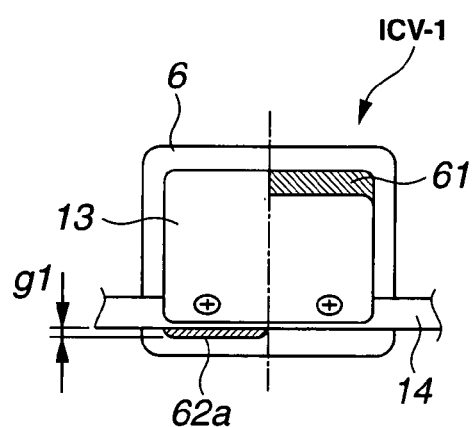
FIGS. 4A to 4D are views similar to FIG. 2B, but showing first, second, third and fourth modifications of the intake device of the first embodiment of the present invention.

As is seen from FIG. 4A, in first modification ICV-1, the upper side open portion 61 is the same as that shown by FIG. 2B of the above-mentioned first embodiment. While, in this first modification ICV-1, the lower side open portion 62a is a half of the above-mentioned elongate clearance 62 in length. That is, the portion 62a is provided at a lower left half of valve plate 13. More specifically, such half-sized clearance 62a is produced by providing a left half of the bottom wall of the rectangular parallelepiped given portion of intake tube 6 with a rounded groove. The half-sized clearance 62a is shown to have a thickness "g1". In this first modification ICV-1, a possible undesirable phenomenon wherein due to positioning of the upper side open portion 61 at the right position, the power of backflow of the residual gas into intake tube 6 is inevitably increased is suppressed or at least minimized. If desired, the half-sized clearance 62a may be provided by forming a round recess about pivot shaft 14.

Figure 4B:
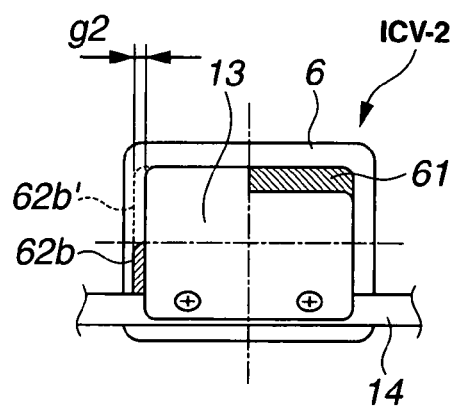

As is seen from FIG. 4B, in second modification ICV-2, the upper side open portion 61 is the same as that of the above-mentioned first modification ICV-1. While, in this second modification ICV-2, the lower side open portion 62b is defined by providing a lower left wall of the rectangular parallelepiped given portion of intake tube 6 with a shallow recess. The recess is shown to have a thickness "g2". If desired, as is indicated by a broken line in FIG. 4B, the left wall of the rectangular parallelepiped given portion may be formed with an elongate recess 62b' for the lower side open portion, that extends between upper and lower walls of the given portion as shown.

Figure 4C:
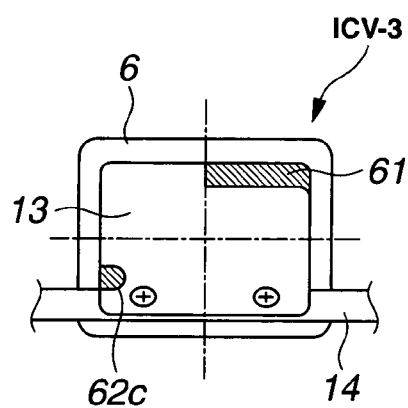

Furthermore, if desired, in place of the recess 62b, valve plate 13 may be provided at a left lower portion thereof with a cut 62 for producing the lower side open portion, as is shown in FIG. 4C. This is the third modification ICV-3 of the intake control valve ICV.

Figure 4D:
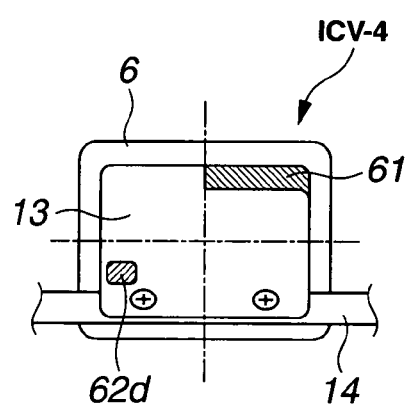

As is seen from FIG. 4D, in fourth modification ICV-4 of the intake control valve ICV, an opening 62d is formed in a lower left portion of valve plate 13 for producing the lower side open portion 62d.

Referring to FIGS. 5A, 5B, 5C, 5D and 5E, there are shown fifth, sixth, seventh, eighth and ninth modifications ICV-5, ICV-6, ICV-7, ICV-8 and ICV-9 of the intake control valve ICV, which are also usable in the intake device of the first embodiment of the present invention.

As is seen from these drawings, the fifth to ninth modifications ICV-5, ICV-6, ICV-7, ICV-8 and ICV-9 are of a so-called butterfly type that comprises a pivot shaft 14 that is rotatably held by a vertically middle portion of the rectangular parallelepiped given portion of intake tube 6 and a valve plate 13 that is fixed at its middle portion to pivot shaft 14 to pivot therewith.

Figure 5A:
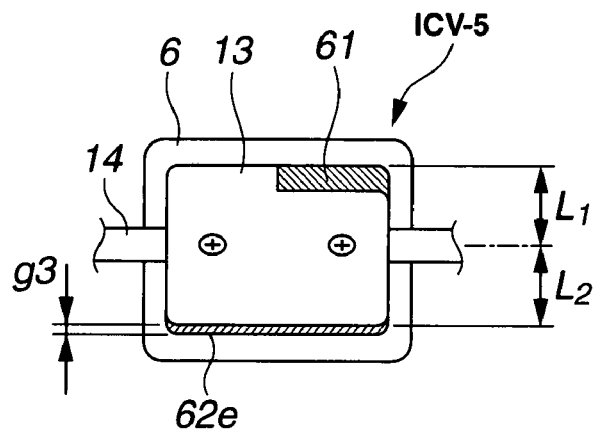
FIGS. 5A to 5E are views also similar to FIG. 2B, but showing fifth, sixth, seventh, eighth and ninth modifications of the intake device of the first embodiment of the present invention.

As is seen from FIG. 5A, in fifth modification ICV-5, the upper side open portion 61 is the same as that shown by FIG. 2B. While, in this fifth modification ICV-5, the lower side open portion is a portion 62e that is defined or provided between the lower end of valve plate 13 and the bottom wall of the rectangular parallelepiped given portion of intake tube 6 as shown. The lower side open portion 62e is shown to have a thickness of "g3" in the drawing. As is understood from the drawing, if pivot shaft 14 is arranged at a vertically middle portion of the given portion of intake tube 6, fixing of valve plate 13 to pivot shaft 14 is so made that the length "L1" from the upper end of valve plate 13 to an axis of pivot shaft 14 is greater than "L2" from the lower end of valve plate 13 to the axis of pivot shaft 14 by a degree of the thickness "g3". With this, such lower side open portion 62e is provided.

Figure 5B:
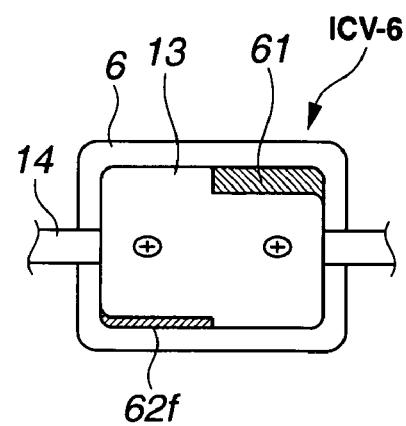

As is seen from FIG. 5B, in sixth modification ICV-6, the lower side open portion 62f is a shorter cut that is formed in a lower left part of valve plate 13. More specifically, the open portion 62f extends from the left end of valve plate 13 to a laterally middle portion of the same, as shown.

Figure 5C:
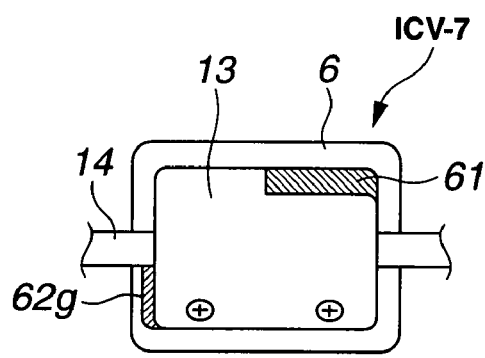

As is seen from FIG. 5C, in seventh modification ICV-7, the lower side open portion 62g is defined by providing a lower left wall of the given portion of intake tube 6 with a shallow recess, like the above-mentioned second modification ICV-2 of FIG. 4B.

Figure 5D:
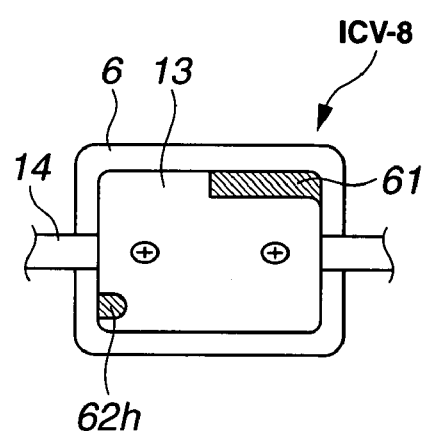

As is seen form FIG. 5D, in eighth modification ICV-8, the lower side open portion 62h is defined by a small cut 62h provided at the left lower portion of valve plate 13, like the above-mentioned third modification ICV-3 of FIG. 4C.

Figure 5E:
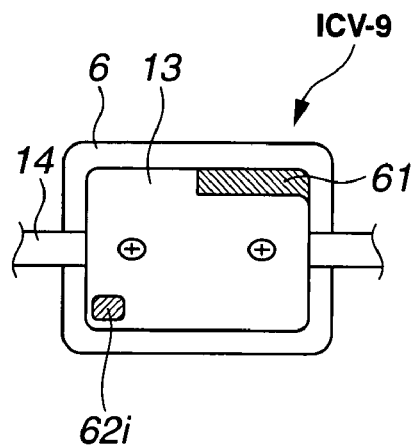

As is seen from FIG. 5E, in ninth modification ICV-9, the lower side open portion 62i is defined by a small opening 62i formed in the left lower portion of valve plate 13, like the above-mentioned fourth modification ICV-4 of FIG. 4D.

For the reasons as mentioned hereinabove, also in these first to ninth modifications ICV-1 to ICV-9 of intake control valve ICV, enhanced swirling and tumbling effects of intake air are expected in combustion chamber 9, and a combustion stability of the engine 1 under a low speed low load operation is improved especially when the engine 1 is operated on a lean air/fuel mixture. Of course, the undesired backflow of a residual gas, which would occur when intake control valve is in its close position, is suppressed or at least minimized. This means that intake control valve and its surrounding area are prevented from being deposited by carbon particles, and thus, a stable intake air control is assured for a long time by the intake control valve.

In the following, an intake device of a second embodiment of the present invention will be described with reference to the accompanying drawings.

Figure 6A:
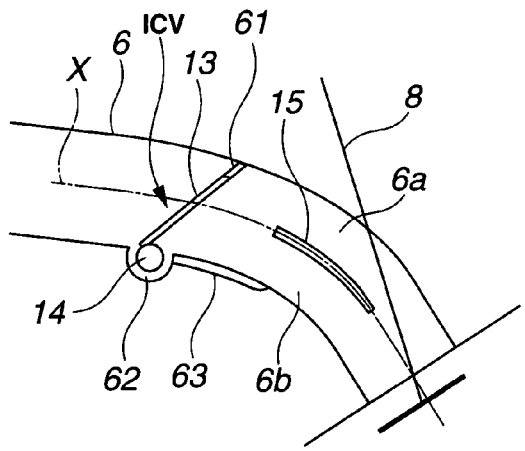
FIG. 6A is a view similar to FIG. 2A, but showing an intake device of a second embodiment of the present invention.

Referring to FIG. 6A, there is shown an intake device of the second embodiment which is similar to that of the above-mentioned first embodiment of FIG. 2A.

As is seen from the drawing (FIG. 6A), the intake device of the second embodiment is substantially the same as that of the above-mentioned first embodiment of FIG. 2A except that in the second embodiment a curved partition wall 15 is provided in intake tube 6 at a position downstream the intake control valve ICV. Partition wall 15 has opposed side ends fixed to diametrically opposed portions of intake tube 6 respectively, and thus the intake passage downstream of intake control valve ICV is divided into upper and lower passages 6a and 6b as shown. As shown, partition wall 15 has an axially extending middle portion that extends on and along the axial center line "X" of intake tube 6.

It is to be noted that as is seen from FIG. 6A, when intake control valve ICV is in its full-close position, the upper side open portion 61 is positioned above the axial center line "X" of intake tube 6, and the lower side open portion 62 is positioned below the axial center line "X". It is further to be noted that when intake control valve ICV is in its full-open position, the rectangular valve plate 13 is neatly received in the recess 63 formed in the lower wall part of intake tube 6.

Due to provision of partition wall 15, the following advantage is further obtained in addition to the advantages possessed by the first embodiment, which will be described with reference to FIG. 6B in the following.

Figure 6B:
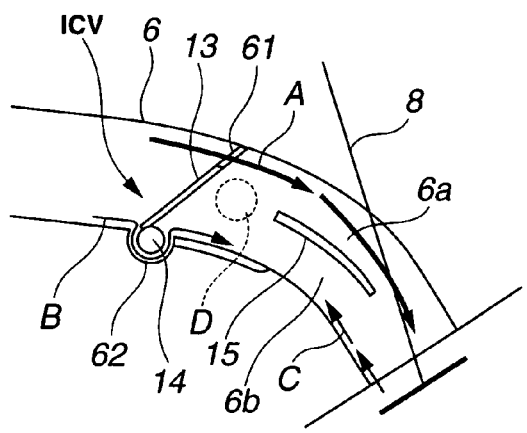
FIG. 6B is a view similar to FIG. 6A, but showing advantageous operation of the intake device of the second embodiment of the present invention.

That is, as is seen from FIG. 6B, due to partition wall 15 by which upper and lower passages 6a and 6b are defined, the upper flow "A" of intake air that has passed through the upper side open portion 61 is forced to flow in only the upper passage 6a as is indicated by thick arrows. Thus, the upper intake air flow "A" is much accelerated and rushed into combustion chamber 9 with a much sharper inlet angle relative to the chamber 9 together with the injected fuel from fuel injection valve 7 (see FIG. 1). Thus, the swirling and tumbling effects of intake air in combustion chamber 9 is much enhanced. Furthermore, as is seen from the drawing (FIG. 6B), the undesired backflow of a residual gas, which would occur when intake control valve ICV assumes its close position as shown, is suppressed or at least minimized by the air flow that has passed through the lower side open portion 62. This means that intake control valve ICV and its surrounding area are prevented from being deposited by carbon particles and thus a stable intake air control is assured for a long time by intake control valve ICV.

Figure 7:
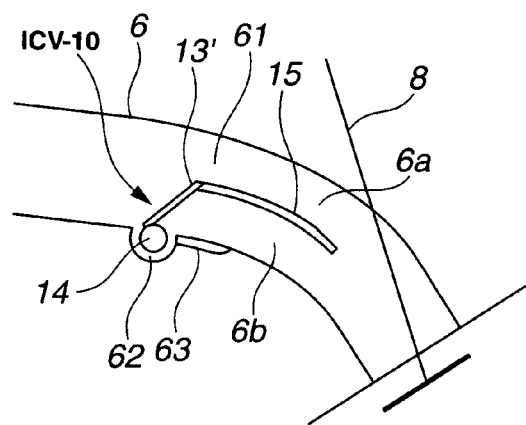
FIG. 7 is a view similar to FIG. 6A, but showing a modification of the intake device of the second embodiment.

Referring to FIG. 7, there is shown a modification of the intake device of the second embodiment.

As is understood from the drawing, in this modification, a smaller intake control valve ICV-10 is used. More specifically, the valve plate 13' employed by the intake control valve ICV-10 is a smaller rectangular plate that is sized to close only the lower passage 6b when assuming its close position, as shown. That is, when intake control valve ICVB-10 is in its close position as shown in the drawing, the upper passage 6a serves as the upper side open portion 61, and the clearance between pivot shaft 14 and the bottom wall of the rectangular parallelepiped given portion of intake tube 6 serves as the lower side open portion 62. Also in this modification, substantially same advantageous effects as those of the above-mentioned second embodiment of FIG. 6A are obtained.

The entire contents of Japanese Patent Application 2006-102896 filed Apr. 4, 2006 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. An intake device of an internal combustion engine, comprising:
    an air intake passage leading to a combustion chamber of the engine through an intake valve;
    a fuel injection valve provided in the air intake passage to inject a fuel into the air intake passage; and
    an intake control valve arranged in the air intake passage at a position upstream of the fuel injection valve,
    wherein the intake control valve comprises:
        a given portion defined by the air intake passage;
        a pivot shaft passing through the given portion;
        a valve plate secured to the pivot shaft to pivot therewith within the given portion, the valve plate being pivotal between a close position to close the air intake passage and an open position to open the air intake passage; and
        an arrangement that provides, when the valve plate assumes the close position, an interior of the air intake passage downstream of the valve plate with mutually isolated first and second air flows that are separated and oriented to enhance a flow of air/fuel mixture in the combustion chamber,
    wherein the arrangement comprises:
        upper side open portion that is provided when the valve plate assumes the close position, the upper side open portion being a given cut formed in an upper right half portion of the valve plate; and
        a lower side open portion that is provided when the valve plate assumes the close position, the lower side open portion being an open portion provided at an opposite position of the given cut with respect to an axial center line of the air intake passage,
    wherein a flow passage sectional area of the lower side open portion is smaller than that of the upper side open portion.

2. An intake device as claimed in claim 1, in which the lower side open portion is a clearance defined between the pivot shaft and a bottom wall of the given portion of the air intake passage.

3. An intake device as claimed in claim 2, in which the clearance extends between a left end of the valve plate to a middle portion of the same.

4. An intake device as claimed in claim 1, in which the lower side open portion is a recess formed on a left wall of the given portion of the air intake passage.

5. An intake device as claimed in claim 4, in which the recess extends between a lower end of the valve plate to a vertically middle portion of the same.

6. An intake device as claimed in claim 1, in which the lower side open portion is a cut formed in a lower left portion of the valve plate.

7. An intake device as claimed in claim 1, in which the lower side open portion is an opening formed in a lower left portion of the valve plate.

8. An intake device as claimed in claim 1, in which the valve plate is secured at its lower end to the pivot shaft, and thus the intake control valve serves as a flap type valve.

9. An intake device as claimed in claim 1, in which the valve plate is secured at its middle portion to the pivot shaft, and thus the intake control valve serves as a butterfly type valve.

10. An intake device as claimed in claim 1, further comprising a partition wall that is provided in the air intake passage downstream of the intake control valve to reinforce the separation between the first and second air flows.

11. An intake device as claimed in claim 10, in which the partition wall has opposed side ends respectively fixed to diametrically opposed portions of the air intake passage.

12. An intake device as claimed in claim 11, in which the partition wall has an axially extending middle portion that extends on and along the axial center line of the air intake passage.

13. An intake device as claimed in claim 12, in which the valve plate of the intake control valve is sized to close only the passage for the second air flow.

14. An intake device as claimed in claim 1, in which a lower part of the given portion of the air intake passage is formed with a recess into which the valve plate is neatly received when the valve plate assumes the open position.

15. An intake device as claimed in claim 1, in which the flow passage sectional area of the lower side open portion is about 20 to 25% of that of the upper side open portion.

16. An intake device as claimed in claim 2, in which the bottom wall of the given portion of the intake passage is formed with a rounded groove that extends along the pivot shaft keeping a given clearance therebetween.

17. An intake device as claimed in claim 2, in which the given portion of the air intake passage has a rectangular cross section, and in which the valve plate is rectangular in shape.

18. An intake device of an internal combustion engine, comprising:
an air intake passage leading to a combustion chamber of the engine through an intake valve;
a fuel injection valve provided in the air intake passage to inject a fuel into the air intake passage;
a throttle valve installed in the air intake passage upstream of the fuel injection valve to control an amount of air led to the combustion chamber;
a control unit that controls operation of the fuel injection valve and the throttle valve in accordance with an operation condition of the engine; and
an intake control valve arranged in the air intake passage between the throttle valve and the fuel injection valve,
wherein the intake control valve comprises:
a rectangular parallelepiped given portion defined by the air intake passage;
a pivot shaft passing through the given portion, the pivot shaft being controlled by the control unit;
a rectangular valve plate secured to the pivot shaft to pivot therewith within the given portion, the rectangular valve plate being pivotal between a close position to close the air intake passage and an open position to open the air intake passage;
an upper side open portion that is provided when the valve plate assumes the close position, the upper side open portion being a given cut formed in an upper right half portion of the valve plate; and
a lower side open portion that is provided when the valve plate assumes the close position, the lower side open portion being an open portion provided at an opposite position of the given cut with respect to an axial center line of the air intake passage,
wherein a flow passage sectional area of the lower side open portion is smaller than that of the upper side open portion.

* * * * *